United States Patent [19]

Dand

[11] 3,722,944

[45] Mar. 27, 1973

[54] STORE RELEASE MECHANISMS

[75] Inventor: Harvey Stewart Dand, Garden Grove, Calif.

[73] Assignee: McDonnell Douglas Corporation

[22] Filed: Apr. 2, 1971

[21] Appl. No.: 130,589

[52] U.S. Cl.............294/83 R, 89/1.5 R, 244/137 R
[51] Int. Cl.................................................B66c 1/34
[58] Field of Search............89/1.5; 294/83; 244/137

[56] References Cited

UNITED STATES PATENTS

| 2,595,450 | 5/1952 | Coffing | 294/83 R |
| 2,832,632 | 4/1958 | Johnson | 89/1.5 G X |
| 3,036,852 | 5/1962 | Mullison | 89/1.5 G X |
| 2,956,477 | 10/1960 | Barr et al. | 89/1.5 G X |
| 3,057,652 | 10/1962 | Geffner et al. | 89/1.5 R X |
| 3,405,966 | 10/1968 | Harley | 294/83 |

*Primary Examiner*—Samuel W. Engle
*Attorney*—Walter J. Jason, Donald L. Royer and George W. Finch

[57] ABSTRACT

Store release mechanisms which include sears and pawls in their release linkages as well as overcenter means in both store engaging and store release positions thereof. Pairs of the present mechanisms are designed to cooperate so that either mechanism can be independently moved into the store engaging position, yet positive means are provided to prevent one or more mechanisms from being in an inadvertent unlocked or unsafe store engaging position.

12 Claims, 4 Drawing Figures

Patented March 27, 1973

INVENTOR.
HARVEY STEWART DAND
BY
George W Finch
- ATTORNEY -

Patented March 27, 1973 3,722,944

INVENTOR.
HARVEY STEWART DAND
BY
George W. Finch
- ATTORNEY -

STORE RELEASE MECHANISMS

BACKGROUND OF THE INVENTION

Many store carriers having release mechanisms for engaging military standard lug rings on a store or bomb are known in the art. These mechanisms usually include two or more rotatable hooks which engage and release the lug rings. The rotation of the hooks is usually controlled by spring loaded and/or overcenter control linkage. After the store is loaded on the carrier with its lugs engaged by the hooks, safety pins are installed adjacent each hook to assure the hooks cannot rotate to inadvertently drop the store. The safety pin holes are usually designed so that the safety pins cannot be installed therein unless the store carrying hooks are in a safe and completely engaged position with their controlling linkage in the proper overcenter position. However, because of the multiplicity of safety pins, there is a tendency on the part of armorers to fail to insert all the pins, which can result in an unsafe condition. The unsafe condition is not likely to be discovered thereafter except through inadvertent store release because it is the insertion of the safety pins which is the final check that the control linkages are properly overcenter. All the safety pins are supposed to be removed just before take-off so that during flight the stores can be released. However, in the heat of combat, it is always possible that one or more of the multitude of safety pins will not get removed, thereby causing the store to undesirably hang up.

In the prior art store mechanisms discussed above, the store release is usually started by electrically firing an explosive cartridge with the expanding gases therefrom being used to energize release linkage and to force the store positively away from the mechanism. Once the spring or overcenter force in the control linkage has been overcome, the weight of the store and the forces of expanding gas exerted through one or more ejectors, assure that it clears the store carrier. Unfortunately, when high G loads are being applied to the store, these loads can additionally load the overcenter control linkage so that the force of expanding gases applied thereto through the release linkage and the ejector is not sufficient to overcome the extra load and the store does not release.

SUMMARY OF THE INVENTION

The present store release mechanism overcomes the disadvantages and problems associated with the heretofore known store carriers by providing a hook control and release mechanism which includes fewer parts, one which need be locked by only one safety device and one which is impossible to safety if one or more of the associated hooks are in an unsafe or not completely engaged position. The present invention also includes multiple redundant drive paths so that with certain modes of failure, the mechanism can still operate or be reused in a broken or worn condition.

The present store release mechanism includes a store lug engaging hook which is pivotally mounted to release the lug with its attached store when desired. The rotation of the hook is controlled by an explosive mechanism which applies release forces either directly to overcenter control linkage of the hook by means of a sear and pawl combination or more indirectly through a crank and lever if the sear and pawl fail to operate. When two or more mechanisms are used, the sears of the mechanisms are mounted to move in unison. The sears are positioned and shaped with respect to their associated pawls and control linkage so that both hooks must be in the safe, engaged position before the sears and their connecting linkage can reach a position which allows a single safety device to lock the store carrier.

It is therefore an object of the present invention to provide store carriers which are easy to load and are reliable so that the stores connected thereto are neither inadvertently released nor hung up thereon.

Another object is to provide a store release mechanism whose release means have a substantial mechanical advantage to assure sufficient store release force.

Another object is to provide store release mechanisms which can be used in pluralities and yet be locked by one safety device.

Another object of the present invention is to provide a store release mechanism having a minimum of parts.

Another object is to provide a store release mechanism which includes back-up release paths so that if the primary release path is damaged, another release path will enable the desired store release.

These and other objects and advantages of the present invention will become apparent after considering the following detailed specification which covers a preferred embodiment thereof in conjunction with the accompanying drawings wherein:

BRIEF DESCRIPTION OF THE DRAWINGS

FIG. 4 is an elevational view of the store carrier rack of FIG. 1 with the forward mechanism thereof closed and the aft mechanism completely open.

DESCRIPTION OF THE SHOWN EMBODIMENT

Figure 1:
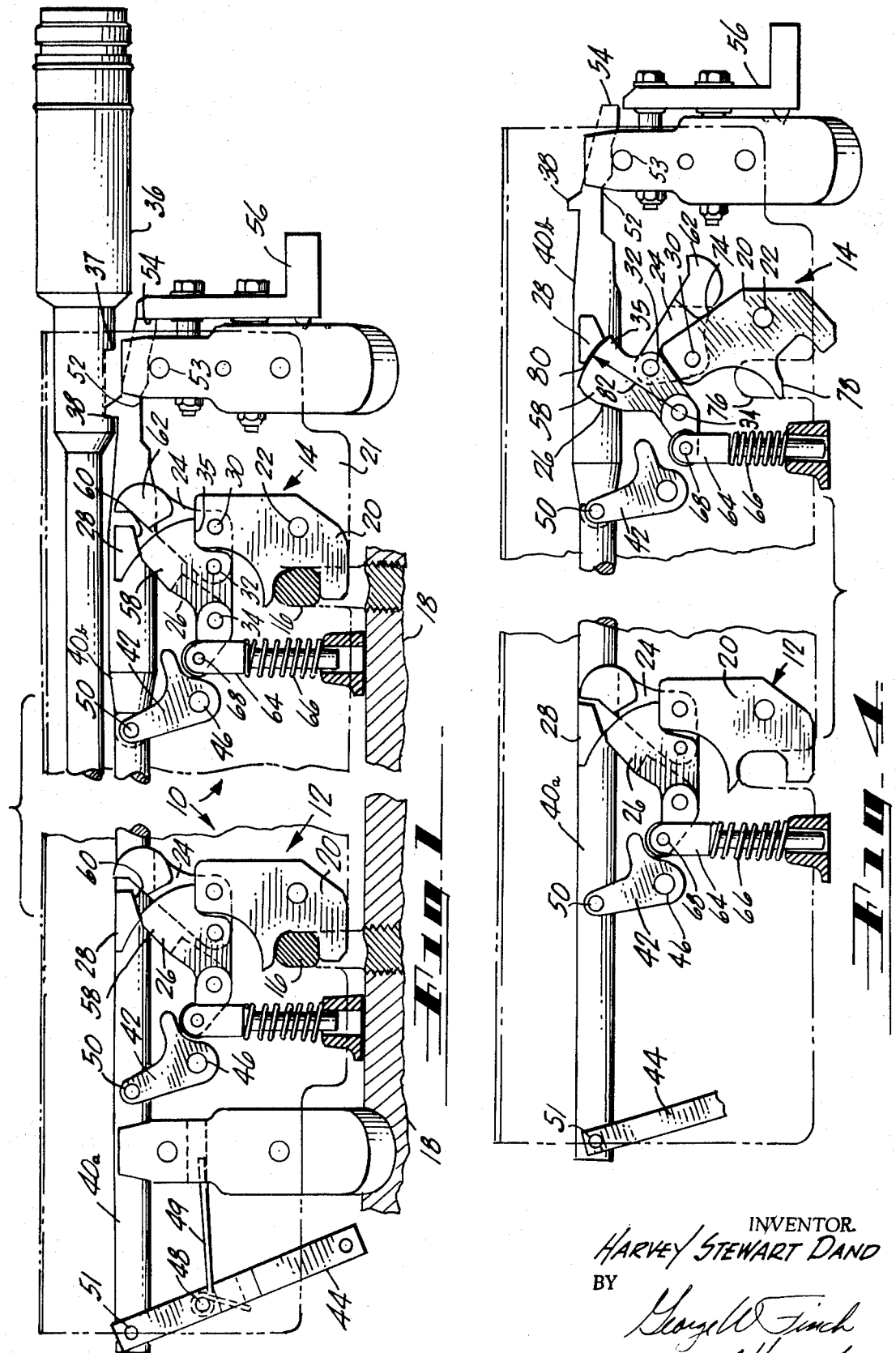
FIG. 1 is an elevational view of the pertinent portions of a store carrier rack employing store release mechanisms of the present invention.

Referring to the drawings more particularly by reference numbers, number 10 in FIG. 1 refers to a store carrier rack which includes similar fore and aft store release mechanisms 12 and 14 respectively with both of the mechanisms 12 and 14 in their locked conditions in engagement with the lugs 16 of a store 18. The mechanisms 12 and 14 are substantially the same and each includes a hook 20 adapted to engage a lug 16 of the store 18. The hooks 20 are mounted for rotation to the frame 21 of the rack 10 about pivots 22 so that with the orientation shown, counterclockwise movement of the hooks 20 about the pivots 22 releases the lugs 16 of the store 18.

The rotation of a hook 20 about its pivot 22 is controlled by an associated control linkage which includes a pawl link 24, a lobed lever 26 and a sear 28 against which both the pawl link 24 and the lobed lever 26 operate. The pawl link 24 is connected for rotation to the upper portion of the hook 20 by means of pivot 30 and to the lobed lever 26 by another pivot 32, the lever 26 being in turn connected for rotation with respect to the frame 21 by another pivot 34. When the hook 20 is engaging a store lug 16, the force applied thereto by the weight of the store 18 tries to rotate the hook 20 counterclockwise. This hook moment force is transmitted through the link 24, the lever 26 and the pivot 34 to the frame 21. The pivot 32 is preferably below and just out of alignment with the pivots 30 and 34 when the mechanism is locked. Therefore, the moment force tries to rotate link 24 counterclockwise and the lever 26 clockwise. When urged clockwise, an abutment surface 35 of the lever 26 abuts the top of the hook 20 to set up a mechanism locking, overcenter condition which exists until the pivot 32 is forced above the center line between pivots 30 and 34.

When it is desired to release the store 18 from the store carrier rack 10, means such as an electrically actuated explosive breech 36 are employed to provide release force. The release force is transmitted from the breech 36 by means of a slot 37 therein and a slot abutting tang 38 which forms a part of an activating ladder 40. The release force causes aftward motion of the ladder 40.

The ladder 40, which can be a single member (FIGS. 2 and 3) or multiple members 40a and 40b (FIGS. 1 and 4), is supported for arculate movement by one or more cranks 42 and a manual release arm 44. The cranks 42 are pivotally mounted at the lower ends thereof to the frame 21 by pivots 46 while the manual release arm 44 is pivoted to the frame 21 by pivot 48 which is in alignment with the crank pivots 46. A spring 49 is connected between the frame 21 and the arm 44 at the pivot 48 thereof to bias the ladder 40 forward. The upper ends of the cranks 42 are pivotally connected to the ladder 40 by other pivots 50 as is true of the upper end of the manual release arm 44 which is connected thereto by pivot 51. The angles and the friction between the sears 28 and the lobed levers 26 and the forces applied by the spring 49 are such that even during a high G catapult launch of the aircraft, the ladder 40 does not move back to inadvertently release the store.

The ladder 40 can be constructed including a forward portion 40a and an aft portion 40b as aforesaid. The two portions 40a and 40b are pivotally connected by pivot 50 in the aft mechanism 14, as shown in FIGS. 1 and 4. The aftward part of the aft ladder portion 40b includes a contoured surface 52 which rides on a pin 53. When the ladder 40 is moved to the rear a sufficient distance, the contoured surface 52 allows the tang 38 to drop out of the slot 37 enabling the breech 36 to be removed. Breeches such as breech 36 are usually locked in place by a quarter turn. If the breech 36 does not get completely turned and locked when installed, the tang 38 may not engage the slot 37 in which case the firing of the breech 36 will not move the ladder 40. Due to the interaction of the contoured surface 52 and and the pin 53, the present ladder 40 cannot be moved far enough forward to allow hook closure unless the tang 38 is in the slot 37. Therefore, the surface 52 and pin 53 assure that the breech 36 is properly installed before a store can be loaded.

The aft end of the ladder 40 includes an abutment surface 54 which is adapted to engage a vertically movable safety lock 56. When the safety lock 56 is in the position shown in FIG. 1, the ladder 40 cannot be moved aftward to begin the release cycle and allow rotation of the hooks 20. However, when the safety lock 56 is snapped downwardly to the position shown in FIG. 4, it no longer impedes the aftward travel of the ladder 40 which thereafter can be forced aftward by the breech 36 to cause release of the store 18.

Figure 2:
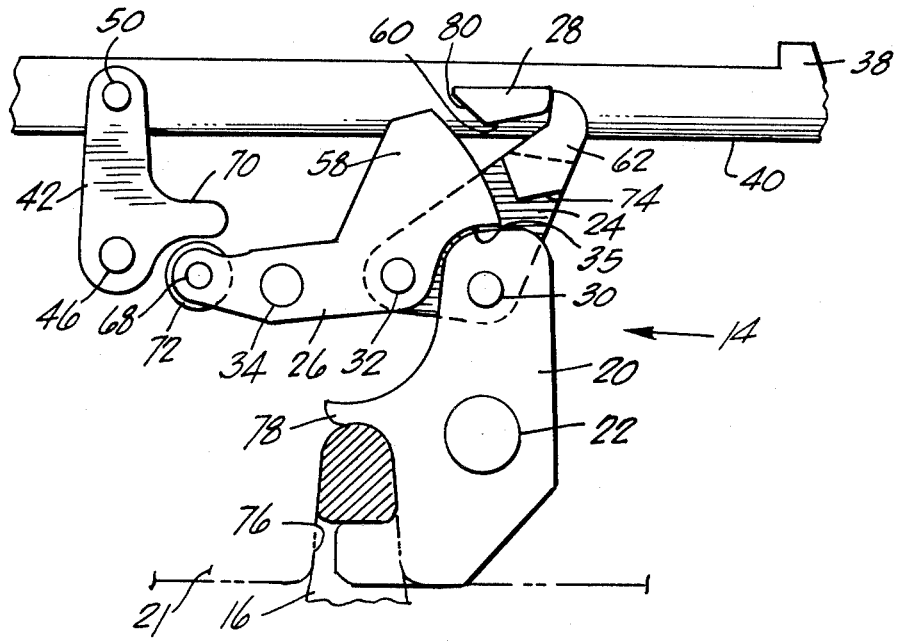
FIG. 2 is an enlarged elevational view of the aft mechanism of FIG. 1 just as the overcenter action of its control linkage has been overcome during a store release.

When the breech 36 is fired to move the ladder 40 aftward, the first increment of aft ladder movement moves the sears 28 aftward and upward enough to clear a path for lobes 58 on the lobed levers 26 which were previously in abutment with bottom surfaces 60 of the sears 28. As the ladder 40 continues to move aftward, each sear 28 strikes the pawl portion 62 of the adjacent pawl link 24 as shown in FIG. 2 which causes the pawl link 24 to rotate clockwise about pivot 30. The rotation of the pawl link 24 about pivot 30 causes pivot 32 to lift out of the overcenter condition and rotate the lobed lever 26 in a counterclockwise direction about pivot 34.

Each lobed lever 26 and pawl link 24 combination is normally additionally held in the overcenter condition by an associated plunger 64 which is spring loaded upwardly by a compression spring 66 (FIGS. 1 and 4). The plunger 64 is pivotally connected to the end of the lobed lever 26 by pivot 68. The force applied to the pawl link 24 by contact with the sear 28 when the ladder 40 is forced aftward, further compresses the spring 66 as the overcenter condition is overcome.

Under normal circumstances the action between the sear 28 and the pawl link 24, and the weight of the store 18 would probably be sufficient to rotate the hook 20 to release the store 18. However, in the present invention additional means are included to provide a redundant release path as an insurance factor in case the pawl activated release path fails. These means include a protuberance 70 on each crank 42. As the ladder 40 is moved aftward, the crank 42 rotates clockwise and the protuberance 70 contacts a roller 72 mounted to the end of the lobed lever 26 by the pivot 68. As should be obvious, the mechanical advantage provided by the protuberance 70 and the roller 72 is less than the mechanical advantage provided between the sear 28 and the pawl link 24. Therefore, at a predetermined point in the release cycle when the high release forces to break the overcenter condition are no longer required, the protuberance 70 and roller 72 combination catches up and takes over the release drive from the pawl 24 and sear 28 combination. Either the pawl activated release path or the protuberance activated release path is capable of causing complete store release if the other fails. However, the pawl activated release path can overcome higher hook loads than the protuberance activated release path.

Figure 3:
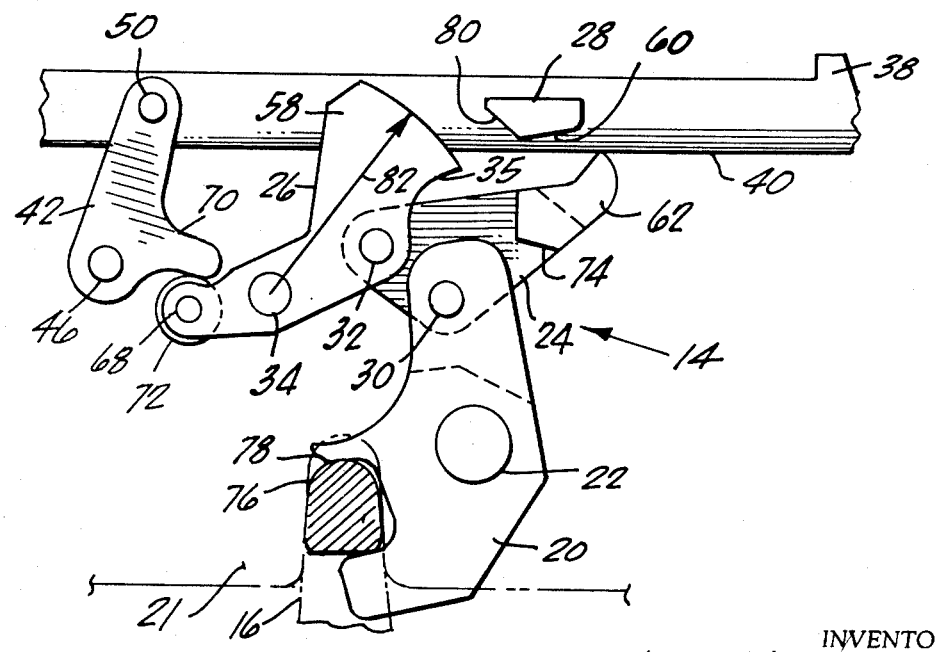
FIG. 3 is a view similar to FIG. 2 with the mechanism more advanced into its release cycle.

As the ladder 40 moves further aftward as shown in FIG. 3, the crank protuberance 70 further causes rotation of the link 24 and the lever 26 so that the hook 20 releases the store 18. The rotations of the link 24 and the lever 26 continue until an abutment surface 74 of the pawl portion 62 contacts the hook 20 as shown in the aft mechanism 14 of FIG. 4. At that point, the pivot 30 has gone overcenter with respect to the pivots 22 and 32 and the spring 66 therefore causes the hook 20 to remain in an open condition and ready to be re-engaged with the store lug 16.

When reloading the present store carrier rack 10, each hook 20 can be independently returned to its locked condition as can be seen with reference to the forward mechanism 12 of FIG. 4. The reloading is usually accomplished by lifting the store lug 16 into a slot 76 formed in the frame 21 and into abutment with a hook protuberance 78 which engages the top of the lug 16 and causes the hook 20 to rotate in a clockwise direction until it snaps out of its open overcenter condition and into its locked overcenter condition. With only one mechanism 12 or 14 in the closed condition, the spring loaded ladder 40 cannot move far enough forward to allow the safety lock 56 to be snapped upward to its safety maintaining and indicating position. This is because the forward movement of the ladder 40 is blocked by interference between the lobe 58 of the open mechanism and a second bottom surface 80 of the sear 28 associated therewith. The lobe 58 and the surface 80 define a blocking radius 82 centered on pivot 34 and therefore, even though the lobe 58 and the sear surface 80 are in abutment, it is still possible to cause an unlocked mechanism, shown as mechanism 14 in FIG. 4, to snap into the hook engaging position by applying force upwardly on protuberance 78 of the hook 20. The spring loaded ladder 40 then moves to its forwardmost position locking the mechanisms 12 and 14 and allowing upward movement of the safety lock 56 to cause and indicate a safe condition of the store carrier rack 10.

Although in the present application the store rack along with its store release mechanisms is shown primarily as a two dimensional apparatus, such mechanisms are usually constructed having sears 28 on both sides of the ladder 40 and bifurcated lobes 58 and pawl portions 62 which make contact with the sears 28 on both sides of the ladder 40. This equalizes the stress on the ladder 40 to eliminate any tendency of the ladder 40 to bend laterally away from the pawl link 24 and the lobed lever 26.

Thus there has been shown and described novel store release mechanisms which can be used singularly or in pluralities in a store carrier rack which fulfill all of the objects and advantages sought therefor. Many changes, modifications, variations and other uses and applications of the subject invention will, however, become apparent to those skilled in the art after considering this specification together with the accompanying drawings. All such changes, modifications, variations and other uses and applications which do not depart from the spirit and scope of the invention are deemed to be covered by the invention which is limited only by the claims which follow.

What is claimed is:

1. Mechanism for predeterminately retaining and releasing a store, said mechanism comprising:
    a frame;
    at least one hook adapted for engagement with the store and pivotally mounted to said frame;
    control linkage, said control linkage including first and second links which are pivotally connected, said first link also being pivotally connected to said hook and said second link also being pivotally connected to said frame, first overcenter abutment means and bias means to retain said first and second links in general alignment to form a compression assembly capable of predeterminately retaining said hook in a closed store engaging position, and second overcenter abutment means which in combination with said bias means, maintain said first and second links at a substantial angle therebetween to predeterminately retain said hook in an open store releasing position; and
    release means in position to predeterminately apply force to said control linkage to cause relative movement of said first and second links out of general alignment so that said hook releases the store, said release means including a release ladder, a pair of sears fixedly attached to opposite sides of said ladder, and actuation means to move said ladder and said attached sears in a first direction, said first link including a bifurcated pawl portion positioned a predetermined distance from and out of alignment with the pivotal connection of said first link, said sear pair contacting said bifurcated pawl portion when said sear pair is moved by said actuation means to rotate said first link out of the first overcenter position with said second link.

2. Mechanism for predeterminately retaining and releasing a store, said mechanism comprising:
    a frame;
    at least one hook adapted for engagement with the store and pivotally mounted to said frame;
    control linkage, said control linkage including first and second links which are pivotally connected, said first link also being pivotally connected to said hook and said second link also being pivotally connected to said frame, first overcenter abutment means and bias means to retain said first and second links in general alignment to form a compression assembly capable of predeterminately retaining said hook in a closed store engaging position, and second overcenter abutment means which in combination with said bias means, maintain aid first and second links at a substantial angle therebetween to predeterminately retain said hook in an open store releasing position; and
    release means in position to predeterminately apply force to said control linkage to cause relative movement of said first and second links out of general alignment so that said hook releases the store, said release means including at least one sear, and actuation means to move said sear in a first direction to contact said first link at a position thereon a predetermined distance from and out of alignment with the pivotal connections of said first link to rotate said first link out of alignment with said second link.

3. The mechanism defined in claim 1 wherein said release means also include:
    bias means to urge said sear in a second direction opposite said first direction.

4. The mechanism defined in claim 1 wherein said release means also include:
    crank means operatively connected to said release means for movement with said sear, said crank means abutting said second link at a position thereon a predetermined distance from and out of alignment with the pivotal connections of said second link and rotating said second link as said actuation means move said sear to assure said first and second links are forced out of the first overcenter position.

5. The mechanism defined in claim 1 wherein said sear includes:
an abutment surface thereon, said sear abutment surface being positioned to contact with said second link at a portion thereof a predetermined distance from and out of alignment with the pivotal connections of said second link to prevent rotation thereof out of general alignment with said first link until said actuation means have moved said sear a predetermined distance in said first direction.

6. Mechanism for predeterminately retaining and releasing a store, said mechanism comprising:
a frame;
at least one hook adapted for engagement with the store and pivotally mounted to said frame;
control linkage, said control linkage including first and second links which are pivotally connected, said first link also being pivotally connected to said hook and said second link also being pivotally connected to said frame, first overcenter abutment means and bias means to retain said first and second links in general alignment to form a compression assembly capable of predeterminately retaining said hook in a closed store engaging position, and second overcenter abutment means which in combination with said bias means, maintain said first and second links at a substantial angle therebetween to predeterminately retain said hook in an open store releasing position;
release means in position to predeterminately apply force to said control linkage to cause relative movement of said first and second links out of general alignment so that said hook releases the store;
a second hook adapted for engagement with a store and pivotally mounted to said frame;
second control linkage, said second control linkage including first and second links which are pivotally connected, said second control linkage first link also being pivotally connected to said second hook and said second control linkage second link also being pivotally connected to said frame, first overcenter abutment means and bias means to retain said second control linkage first and second links in general alignment to form a compression assembly capable of predeterminately retaining said second hook in a closed store engaging position, and second overcenter abutment means which in combination with said second control linkage bias means maintain said second control linkage first and second links at a substantial angle therebetween to predeterminately retain said second hook in an open store releasing position, said release means being in position to predeterminately apply force to said control linkage to cause relative movement of said second control linkage first and second links out of general alignment so that said second hook releases the store; and
locking means having a locking abutment surface, said release means including a locking abutment surface thereon, said locking means being movable so said locking abutment surface moves into a locking position in engagement with said release means locking abutment surface to prevent said release means from moving and applying releasing force to said first and second control linkages, said locking means and said release means having second abutment surfaces at angles to said locking abutment surfaces thereof which engage when said release means is in a position indicating said first and second control linkages are not maintaining said first and second hooks in their closed positions to prevent said locking means from being moved into the locking position.

7. The mechanism defined in claim 6 wherein said release means include:
a first blocking abutment surface fixedly connected to said release means, said first blocking abutment surface being positioned to engage said first control linkage when said first control linkage is not in the hook closed position, said first blocking abutment surface when engaged with said first control linkage maintaining said release means in a position in which said second abutment surfaces of said locking means and said release means engage.

8. The mechanism defined in claim 7 wherein said release means include:
a second blocking abutment surface fixedly connected to said release means, said second blocking abutment surface being positioned to engage said second control linkage when said second control linkage is not in the hook closed position; said second blocking abutment surface when engaged with said second control linkage maintaining said release means in a position in which said second abutment surfaces of said locking means and said release means engage whereby the prevented movement of said locking means indicates a not closed condition of at least one hook.

9. The mechanism defined in claim 6 wherein said release means include:
a first blocking abutment surface fixedly connected to said release means, said first blocking abutment surface being positioned to engage and restrict motion of said first control linkage when said first control linkage is in the closed position and said locking means are in the locking position so that said first control linkage cannot allow said first hook to open.

10. The mechanism defined in claim 9 wherein said release means include:
a second blocking abutment surface fixedly connected to said release means, said second blocking abutment surface being positioned to engage and restrict motion of said second control linkage when said second control linkage is in the closed position and said locking means are in the locking position so that neither said second nor said first control linkages can allow their associated hooks to open.

11. The mechanism defined in claim 6 wherein said release means include:
first and second blocking abutment surfaces, said first and second blocking abutment surfaces being positioned to engage and block movement of said first and second control linkage respectively when said first and second control linkage are in the closed positions and said locking means are in the locking position, said first blocking abutment surface being shaped to unblock and allow movement of said first control linkage when said release means are moved a distance less than a distance required to cause said second control linkage to move said second hook from a closed to an open position.

12. Mechanism for predeterminately retaining and releasing a store, said mechanism comprising:
a frame;
at least one hook adapted for engagement with the store and pivotally mounted to said frame;
control linkage, said control linkage including first and second links which are pivotally connected, said first link also being pivotally connected to said hook and said second link also being pivotally conntected to said frame, first overcenter abutment means and bias means to retain said first and second links in general alignment to form a compression assembly capable of predeterminately retaining said hook in a closed store engaging position, and second overcenter abutment means which in combination with said bias means, maintain said first and second links at a substantial angle therebetween to predeterminately retain said hook in an open store releasing position;
release means in position to predeterminately apply force to said control linkage to cause relative movement of said first and second links out of general alignment so that said hook releases the store;
a second hook adapted for engagement with a store and pivotally mounted to said frame; and second control linkage, said second control linkage including first and second links which are pivotally connected, said second control linkage first link also being pivotally connected to said second hook and said second control linkage second link also being pivotally connected to said frame, first overcenter abutment means and bias means to retain said second control linkage first and second links in general alignment to form a compression assembly capable of predeterminately retaining said second hook in a closed store engaging position, and second overcenter abutment means which in combination with said second control linkage bias means maintain said second control linkage first and second links at a substantial angle therebetween to predeterminately retain said second hook in an open store releasing position, said release means being in position to predeterminately apply force to said control linkage to cause relative movement of said second control linkage first and second links out of general alignment so that said second hook releases the store, said release means including an explosive device having a slot therein, and a ladder operatively connecting said explosive device to said first and second control linkage, said ladder including an upstanding tang which extends into said explosive device slot, and a cam opposite said tang, said cam riding on said frame and being shaped to allow downward movement of said ladder so said tang can be inserted in said explosive device slot and prohibit movement of said ladder to the hook closed position when said tang is not in said explosive device slot.

* * * * *